United States Patent [19]

Abe et al.

[11] 4,334,933

[45] Jun. 15, 1982

[54] PROCESS FOR PREPARING STABLE INORGANIC PIGMENT

[75] Inventors: Nobuyoshi Abe, Urawa; Syozo Takatsu, Kamagaya; Kiyoshi Kanemaru, Urawa; Minoru Yokoyama, Tokyo, all of Japan

[73] Assignees: Toho Ganryo Kogyo Co., Ltd.; Nippon Chemical Industrial Co., Ltd., both of Tokyo, Japan; part interest to each

[21] Appl. No.: 108,938

[22] Filed: Dec. 31, 1979

[30] Foreign Application Priority Data

May 21, 1979 [JP] Japan .................................. 54-61599

[51] Int. Cl.$^3$ .............................................. C09C 1/00
[52] U.S. Cl. .................................. 106/305; 106/288 B; 106/308 B; 106/309
[58] Field of Search ................. 106/288 B, 308 B, 290, 106/309, 305, 304

[56] References Cited

U.S. PATENT DOCUMENTS

| | | | |
|---|---|---|---|
| 2,296,638 | 9/1942 | Hanahan | 106/305 X |
| 2,731,326 | 1/1956 | Alexander et al. | 423/338 |
| 2,913,419 | 11/1959 | Alexander | 252/313 S |
| 3,337,299 | 8/1967 | Burke | 252/313 S |
| 3,454,513 | 7/1969 | Azarian | 106/290 X |
| 3,639,133 | 2/1972 | Linton | 106/308 B X |
| 3,954,496 | 5/1976 | Batzar | 106/308 B |
| 4,082,905 | 4/1978 | Stephan et al. | 106/308 B X |
| 4,132,560 | 1/1979 | Marquisee et al. | 106/300 X |
| 4,158,074 | 6/1979 | Uchiyama et al. | 106/290 X |

FOREIGN PATENT DOCUMENTS

| | | | |
|---|---|---|---|
| 537480 | 2/1957 | Canada | 252/313 S |
| 778695 | 7/1957 | United Kingdom | 252/313 S |

OTHER PUBLICATIONS

Iler, R. K.-The Colloid Chemistry of Silica and Silicates"-(1955) pub. by Cornell Univ., N.Y. pp. 91-92.

Primary Examiner—Helen M. McCarthy
Attorney, Agent, or Firm—Sughrue, Mion, Zinn, Macpeak and Seas

[57] ABSTRACT

A process for preparing a stable inorganic pigment coated with a fine amorphous silica which comprises forming a silica sol in an aqueous prepared slurry of an inorganic pigment by reacting an alkali silicate solution with one or more acid gases so that a fine silica sol covers the surfaces of the particles of the inorganic pigment.

4 Claims, No Drawings

PROCESS FOR PREPARING STABLE INORGANIC PIGMENT

BACKGROUND OF THE INVENTION

1. Field of the Invention

This invention relates to a process for preparing stable inorganic pigment the particles of which are coated with fine amorphous silica and which has good pigment characteristics, i.e. high chemical resistance, hydrogen sulfide resistance, light resistance, weatherability, heat resistance and storage stability.

2. Description of the Prior Art

Pigments are widely used as colorants for paints, printing ink, and many varied articles such as plastics, rubber, construction materials, cosmetics and paper. They are also used as an agent for providing protective coatings because of advantageous physical and chemical properties such as their hiding power, covering power, reflecting properties, insulating effect and rust preventing power. However, the pigments have undesired properties of their own, for example there is the chalking of titanium oxide, the heat- or light-induced discoloration of chrome yellow and yellow oxide and the decomposition of inorganic pigments (e.g., cadmium pigment, ultramarine, etc.) with acid. Hence, the type and amount of pigments to be used as essentially limited by the manufacturing process and the use of the articles to which the pigments are applied. On the other hand, the type of pigments determines what articles they should be applied to. In addition, with the recent improvement in the technology of forming and processing olefinic plastics as well as the use of forming temperatures higher than 250° C., the demand for highly heat resistant pigments has increased. Under these circumstances, various industrial sectors have expressed a strong need for the improvement in pigment characteristics such as light resistance, weatherability, chemical resistance, hydrogen sulfide resistance, heat resistance, storage stability and dispersibility. It is true that many processes for improving the characteristics of pigments have been proposed and implemented in commercial plants, but the fact is they have their own advantages and disadvantages. For example, Japanese Patent Publication No. 16531/74 teaches a method of covering pigment particles with a metal oxide by hydrothermal treatment with heat and pressure, but the method does not fully provide the desired improvement in resistance probably because the particles of the metal oxide grow during the hydrothermal treatment. The method described in Japanese Patent Publication No. 9555/71 covers the particles of a lead chrome pigment with the fine silica produced from a dilute aqueous solution of sodium silica and dilute sulfuric acid. The resulting silica cover makes the pigment very resistant in various aspects, but because of the strong acidity of sulfuric acid, the method has the potential hazard of damaging the pigment and therefore, cannot be used in general applications. It has been confirmed that the fine silica sol produced by decomposing an aqueous solution of alkali silicate using specific compounds is very active and has an extremely high capability for covering the particles of pigment. Therefore, a technique that can cover the particles of whatever type of pigment with such silica sol would be a great contribution to the pigment industry where the demand for improved pigment characteristics is strong. However, it is considerably difficult to cover the particles of various pigments with such reactive silica sol of minimum particle size without adversely affecting the particles. Some combinations of pigment and alkali silicate decomposer may damage the pigment. The slightest variation in the temperature and pH used in decomposition of the aqueous sodium silicate results in a considerable change in the covering power of the silica and, particularly, the choice of the decomposer which is reacted with the aqueous silicate is the most predominant of the factors that affect the covering power of the silica.

As a result of various studies on a method of covering the particles of a pigment with a protective coat which is free from the defects described above, the inventors have found that certain acid gases will react with an aqueous solution of alkali silicate and form an extremely fine and active silica which will not damage the particles of inorganic pigment. The inventors have also found that the pigment the particles of which are coated with such silica has remarkably high resistance.

SUMMARY OF THE INVENTION

Therefore, this invention provides a process for preparing a stable inorganic pigment composition coated with a fine amorphous silica which comprises forming a silica sol in an aqueous prepared slurry of an inorganic pigment by reacting an alkali silicate solution with one or more acid gases so that a fine amorphous silica is deposited on the surfaces of the particles of the inorganic pigment.

DETAILED DESCRIPTION OF THE INVENTION

The process of this invention is applicable to any type of inorganic pigments and illustrative typical pigments include the following: chromate pigments such as chrome yellow, chrome vermilion and barium chromate; iron oxide pigments such as yellow oxide, red oxide and iron black; titanium oxide pigments such as titanium oxide and titanium yellow; lead oxide pigments such as red lead oxide, white lead and litharge; calcium salt pigments such as calcium carbonate; barium salt pigments such as barium carbonate and barium sulfate; magnesium salt pigments such as magnesium carbonate; cobalt pigments such as cobalt violet, cobalt blue and cobalt green; manganese pigments such as manganese violet and manganese blue; cadmium pigments such as cadmium yellow and cadmium red; vermilion, antimony trioxide, lead sulfate, zinc oxide, aluminum oxide, lithopone, ultramarine, viridian and chromium oxide green; and metal powder pigments such as silver, copper, zinc, tin, and copper-zinc alloy. Calcined pigment and silicate inorganic powder pigments such as talc, kaolin, aluminum silicate, magnesium silicate, and calcium silicate may also be employed.

Also included among the inorganic pigments which can be treated in the present invention are metal powder pigments. Any metal powder pigment that is stable in an aqueous alkaline solution can be treated in accordance with the present invention. Typical examples are silver, tin, zinc, copper, as well as alloys such as a copper-zinc alloy. In most cases, a copper-zinc alloy is particularly preferred as a golden yellow pigment.

Prior to covering with fine silica, the particles of these pigments may be covered with hydrous oxides of metals such as zirconium, aluminum, titanium, cerium, antimony and magnesium. Metal powder pigments may be subjected to the conventional chromate treatment or heat treatment using boric acid. For details of these treatments, see, for instance, Japanese Patent Publications Nos. 6568/66, 2594/67, 15468/67 and 408/78. These pigments must, either directly or after the preliminary treatment, be formulated as a uniform slurry before the particles are subjected to the subsequent step of covering with a fine amorphous silica. Inorganic pigments can be adequately dispersed in an aqueous medium to form a slurry of a desired concentration, but most pigments are preferably dispersed under alkaline condition. Because metal powder pigments often have surfaces covered with various oily coatings in production or application, such pigments can effectively be dispersed using a surfactant having a wetting effect. Suitable alkaline agents include caustic alkali, alkali carbonate, alkali silicate, alkali phosphate and ammonia as well as basic organic matter such as ethanolamine. These alkali are mentioned here for illustrative purposes only, and they may even be omitted from the treatment of certain types of pigment. Mechanical shearing and ultrasonic waves may advantageously be used to redisperse secondary particles of pigment.

The slurry of pigment is generally prepared using hydrothermal treatment, i.e., heating at 60° to 250° C. under atmospheric or superatmospheric pressure for a period of at least 30 minutes, preferably from 1 to 5 hours under alkaline conditions. Less than 2 mol/l of the alkali is sufficient to achieve uniform dispersion of pigment particles. A low slurry concentration requires a drain system and a reactor of large scale, whereas a high slurry concentration either prevents uniform dispersion of pigment particles or uniform deposition of silica sol in the subsequent step. Therefore, the slurry concentration should be determined at a practical level which is in most cases between about 50 and 300 g/l. The thus prepared slurry of pigment particles is held at a pH between about 7 and 11, preferably between about 8 and 11, by adding, as required, an alkaline agent such as set forth above and at a temperature of at least 60° C., preferably between 70° and 100° C. and may be immediately subjected to silica sol deposition.

If the pigment is subjected to the preliminary treatment to form the hydrous oxide layer described above prior to silica sol deposition, the following method may be used. An aqueous slurry of the proper concentration is mixed with one or more fine hydrous oxides of zirconium, aluminum, titanium, cerium, antimony and magnesium so that the pigment particles are covered with the deposit of such hydrous oxides. To achieve this purpose, an aqueous solution of at least one salt selected from the group consisting of zirconium salt, aluminum salt, titanium salt, cerium salt, antimony salt and magnesium salt is added to the slurry. Examples of the zirconium salt are zirconium sulfate, zirconium chloride, zirconium nitrate, and basic salts of zirconium; examples of the aluminum salt are aluminum sulfate, aluminum chloride, aluminum nitrate, aluminum phosphate and basic salts of aluminum, such as sodium aluminate; examples of the titanium salt are titanium chloride and titanium sulfate; examples of the cerium salt are cerium chloride, cerium sulfate and cerium nitrate; an example of the antimony salt is antimony chloride; and examples of the magnesium salt are magnesium sulfate, magnesium chloride and magnesium nitrate. The concentration of the aqueous solution of these salts is preferably as low as possible, and in most cases, it is preferably less than 10 wt%, more preferably less than 5 wt%, in terms of the corresponding oxide. The aqueous solution of these salts is gradually added to the slurry while it is being stirred at normal temperature or while heating. The slurry may have any level of pH so long as the aqueous salt is hydrolyzed in the slurry. Therefore, a suitable amount of acidic or alkaline agent may be contained in the slurry, and ordinarily, hydrolysis is performed under acidic condition until a fine hydrous oxide is deposited on the pigment particles. The maximum amount of the aqueous solution of metal salt added is 5 wt%, in terms of the corresponding oxide, of the total weight of the pigment and solution. After deposition of the hydrous metal oxide, the pigment particles are redispersed in water or warm water either directly or after separation from the mother liquor, and the pH and temperature of the slurry are adjusted in the manner described above, and the thus prepared slurry is ready for the subsequent step of covering with silica sol. Alternatively, the cake obtained by filtering the mother liquor is dehydrated, redispersed in water or warm water, and the pH and temperature are adjusted likewise to prepare an aqueous slurry suitable for the subsequent step.

Whether the pigment is subjected to a preliminary treatment or not, the pigment slurry subjected to silica sol deposition in accordance with the present invention desirably has a temperature of at least about 60° C. but less than the boiling point of the system, preferably about 70° to 100° C., and a pH of at least 7, preferably between 8 and 11.

The thus prepared pigment slurry is mixed with specific components to form a fine silica sol which covers the pigment particles uniformly. The formation of the silica sol is achieved by adding an aqueous solution of alkali silicate and introducing one or more acid gases described hereunder while the pH and temperature of the slurry is controlled within the above range. Any type of the alkali silicate may be used as an aqueous solution. Generally, it is such that the molar ratio of $SiO_2$ to $M_2O$ (M is Na or K) is between 2 and 4, and sodium silicate having a molar ratio of from 3 to 3.5 is advantageously used. For effective production of the silica sol, the concentration of the aqueous solution of alkali silicate should be as low as possible, but it should not be so low as to decrease the operating efficiency and drainage efficiency; in most cases, the practical concentration is between 1 to 10 wt% as $SiO_2$.

The acid gases which can be used in the present invention include $CO_2$, sulfur oxides ($SO_x$) (x: 1 to 4) such as So, $SO_2$, $SO_3$, etc., and nitrogen oxides ($NO_y$) (y: 0.5 to 3) such as $N_2O$, NO, $NO_2$, etc. Further a halogen gas such as hydrogen chloride gas, bromine gas, etc. can be used for some kinds of pigments. These gases may be used independently or in the form of a mixture thereof and may further be diluted with air or inert gases. Of these gases, $CO_2$ and $SO_2$ are preferably used, and $CO_2$ is, particularly preferred for the purpose. As a source of the acid gases, it is effective and advantageous on an industrial scale to use exhaust gases from various factories or plants, for example gases from a crude petroleum-combustion hearth such as a boiler, a heating hearth if dusts contained in the gases are substantially removed.

In formation of the silica sol in the aqueous prepared slurry of pigment, the reaction should be performed at a certain pH and temperature from beginning to end. Namely, an alkali silicate solution and an acid gas are simultaneously introduced in the aqueous slurry, and the reaction is performed with stirring at the pH of 7 to 11, preferably 8 to 11 and at a temperature of not less than 60° C. under atmospheric pressure. It is particularly preferred that the acid gas is introduced with the addition of the alkali silicate solution over an adequately extended period of time such that the pH of the slurry does not vary more than ±0.5 from a predetermined pH within the aforementioned range. The pH of the reaction system may be adjusted by the addition of other acidic agents such as phosphoric acid, acid salts, organic acids, etc., if necessary. While it is preferable that the reaction is performed calmly for a long period of time, the reaction time is sufficient within six hours.

As a consequence of the reaction described above, many particles of silica sol are formed within the aqueous slurry of pigment without an adverse effect on the pigment particles. The silica sol obtained under atmospheric pressure and under the conditions described above contains a large number of silanol and/or low polymer siloxane groups and therefore is very active. The particle size is generally less than 200 m$\mu$, and in most cases, it is less than 100 m$\mu$. Because of this fineness, the silica sol particles specifically deposit on the pigment particles and form a substantially continuous coat. As a matter of fact, one can observe the way they cover the pigment particles with an electron microscope. According to the experiments conducted by the inventors, if the reaction is performed under conditions outside the indicated pH range, rapid decomposition of the alkali silicate tends to occur and form a porous siloxane bond containing silica gel which results in a heterogeneous coat on the pigment particles. The gel is of high molecular weight and inactive, and it not only forms a heterogeneous coat with respect to the pigment particles but also it fails to deposit on the pigment and assumes a free form. Therefore, neither the method wherein all of the aqueous solution of alkali silicate is added to the slurry at one time and then decomposed through reaction with the acid gas, nor the method wherein the alkali silicate is decomposed rapidly, nor the method wherein it is decomposed under superatmospheric pressure can provide an effective silica coat that increases the resistance of the pigment.

The amount of silica with which the pigment particles are covered according to this invention varies with the use of the pigment, but its content is at least 1 wt% of the total weight of the pigment in terms of $SiO_2$, and in most cases, less than 40 wt% silica will serve the purpose. The particularly preferred range is from 3 to 25 wt%. Silica contained in an amount less than 1 wt% is not capable of covering all particles of the pigment and therefore it cannot enhance the resistance of the pigment to the desired degree. If the silica content exceeds 40 wt%, the concentration of the pigment becomes so low as to reduce its coloring power.

After formation of the deposit of silica sol the slurry may, if necessary, be held for a suitable period under the conditions used for the reaction, and is then neutralized, followed by filtration of the mother liquor. The pigment composition in which the particles are covered with a uniform coat of the silica sol is thoroughly washed by conventional means until salts are no longer observed, and is then dried. Thereafter, the composition is ground into a pigment of the desired particle size which has remarkably high light resistance, weatherability, chemical resistance, hydrogen sulfide resistance, heat resistance and storage stability. As described in the foregoing, this invention is applicable to a wide variety of inorganic pigments, and the particles of the pigment compositions prepared by this invention are covered with a continuous coat which is far stronger than expected and demonstrates the great improvement achieved by this invention. Furthermore, since the exhaust or waste gas from a boiler can be used as the acid gas, the process of the present invention can be quite advantageous on a commercial basis.

This invention will hereunder be described in greater detail by reference to the following examples which are given here for illustrative purposes only and are by no means intended to limit the scope of the invention.

EXAMPLE 1

100 g of dried and ground particles of chrome yellow (color index No. 77600, No. 77601 or No. 77603) were dispersed in 840 g of water and stirred at room temperature to form a uniform slurry. An aqueous solution of sodium silicate (JIS No. 3) was added to the slurry to bring the pH within the range of 9.0 to 10.0. The slurry was then passed through a homogenizer to make a uniform dispersion of the pigment particles which was held at a temperature between 85° and 90° C. and controlled at a pH between 9.0 and 10.0 by adding, as required, an aqueous solution of sodium hydroxide under stirring. To the slurry being stirred, 500 g of an aqueous solution of sodium silicate (JIS No. 3) having a concentration of 4.83 wt% as $SiO_2$ (the solution is referred to as Solution A) and carbon dioxide gas were added or introduced simultaneously at rates of 3.4 g/min and 51.6 ml/min for Solution A and said gas, respectively. The gas was introduced for 180 min. Throughout the addition of the Solution A and introduction of the gas, the slurry was maintained at a pH between 9.0 and 10.0. A fine silica sol resulted to form a uniform deposit on the pigment particles. The slurry was allowed to stand at a pH between 6.5 and 7.0, washed with water by decantation under no more sodium salt was detected, and filtered and dried to provide about 120 g of a chrome yellow composition the particles of which were coated with fine, dense amorphous silica.

EXAMPLE 2

100 g of dried and ground particles of chrome vermilion (color index No. 77605) were dispersed in 840 g of water and stirred at room temperature to form a uniform slurry. An aqueous solution of sodium silicate (JIS No. 3) was added to the slurry to bring the pH within the range of from 9.0 to 10.0. The procedure of Example 1 was repeated to prepare a slurry having a temperature between 90° and 95° C. and a pH between 9.0 and 10.0. To the slurry being stirred, 500 g of an aqueous solution of sodium silicate (JIS No. 3) having a concentration of 4.83 wt% as $SiO_2$ (the solution is referred to as Solution A) and $SO_2$ gas were added or introduced simultaneously at rates of 3.4 g/min and 39.0 ml/min for Solution A and said gas, respectively. The gas was introduced for 180 min. Throughout the addition of the Solution A and introduction of the gas, the slurry was controlled at a pH between 9.0 and 10.0. A fine silica sol resulted to form a uniform deposit on the pigment particles. The procedure of Example 1 was repeated to provide about 120 g of a chrome vermilion composition the particles of which were coated with fine, dense amorphous silica.

EXAMPLE 3

100 g of a synthetic yellow oxide pigment (color index No. 77492) were dispersed in 480 g of water containing 0.48 g ferric chloride, and stirred at room temperature to form a uniform slurry. The procedure of Example 1 was repeated to prepare a slurry having a temperature between 90° and 95° C. and a pH between 9.5 and 10.0. To the slurry being stirred, 128 g of sodium silicate solution having a concentration of 4.83 wt% as $SiO_2$ (the solution is referred to as Solution A) and $NO_2$ gas were added or introduced simultaneously at rates of 0.9 g/min and 13.0 ml/min for Solution A and said gas, respectively. The gas was introduced for 180 min. Throughout the addition of Solution A and introduction of the gas, the slurry was maintained at a pH between 9.0 and 10.0. The procedure of Example 1 was repeated to provide about 106 g of a synthetic yellow oxide pigment composition the particles of which were coated with fine, dense amorphous silica.

EXAMPLE 4

The procedure of Example 3 was repeated to treat 100 g red oxide (color index No. 77491) except that hydrogen chloride gas was introduced as the acid gas at a rate of 10.0 ml/min for 180 min. About 106 g of a red oxide composition the particles of which were coated with fine, dense amorphous silica was provided.

EXAMPLE 5

The procedure of Example 3 was repeated to treat 100 g iron black (color index No. 77499) except that the exhaust gas of a boiler ($CO_2$:12%, $SO_2$:300 ppm, $NO_2$:500 ppm) was introduced as acid gas at a rate of 110 ml/min for 180 min. About 106 g of an iron black composition the particles of which were coated with fine, dense amorphous silica was provided.

EXAMPLE 6

The procedure of Example 1 was repeated to disperse 100 g of cadmium yellow (color index No. 77199) in 840 g of water and prepare a slurry of cadmium yellow having a temperature between 85° and 90° C. and a pH between 9.0 and 10.0. To the slurry being stirred, 456 g of an aqueous solution of sodium silicate having a concentration of 4.83 wt% as $SiO_2$ (the solution was referred to as Solution A) and $CO_2$ gas were added or introduced simultaneously at rates of 3.0 g/min and 47.1 ml/min for Solution A and said gas, respectively. $CO_2$ gas was introduced for 180 minutes. Throughout the addition of Solution A and the introduction of the gas, the slurry was maintained at a pH between 9.0 and 10.0. A fine silica sol resulted to form a uniform deposit on the pigment particles. The slurry was allowed to stand at a pH between 6.5 and 7.0, and the procedure of Example 1 was repeated to provide about 119 g of a cadmium yellow composition the particles of which were coated with a fine, dense amorphous silica.

EXAMPLE 7

100 g of well ground antimony trioxide (color index No. 77052) were dispersed in 1,000 g of water and stirred at room temperature to form a uniform slurry. The procedure of Example 1 was repeated to prepare a uniform dispersion of antimony trioxide having a temperature between 90° and 95° C. and a pH between 9.0 and 10.0. To the slurry being stirred, 128 g of an aqueous solution of sodium silicate having a concentration of 4.83 wt% as $SiO_2$ (the solution was referred to as Solution A) and sulfur dioxide ($SO_2$) gas were added or introduced simultaneously at rates of 0.9 g/min and 10.0 ml/min for Solution A and said gas, respectively. The gas was introduced for 180 min. Throughout the addition of Solution A and the introduction of the gas, the slurry was maintained at a pH between 9.0 and 10.0. The procedure of Example 1 was repeated to provide about 106 g of an antimony trioxide composition the particles of which were coated with fine, dense amorphous silica.

EXAMPLE 8

100 g of ultramarine (color index No. 77007) were dispersed in 1000 g water and stirred at room temperature to form a uniform slurry. The procedure of Example 1 was repeated to prepare a uniform dispersion of ultramarine having a temperature between 90° and 95° C. and a pH between 9.5 and 10.0. To the slurry being stirred, 312 g of an aqueous solution of sodium silicate having a concentration of 4.83 wt% as $SiO_2$ (the solution is referred to as Solution A) and sulfur dioxide gas was added or introduced simultaneously at rates of 21 g/min and 24.4 ml/min for Solution A and said gas, respectively. The procedure of Example 1 was repeated to provide about 114 g of an ultramarine composition the particles of which were covered coated with fine, dense amorphous silica.

EXAMPLES 9 TO 13

The pigments listed below were treated by the procedure of Example 8 under the conditions specified in Table 1, and the respective pigment compositions having particles coated with fine, dense amorphous silica were provided:
Example 9: white lead (color index No. 77597)
Example 10: titanium dioxide (color index No. 77891)
Example 11: titanium yellow
Example 12: lithopone (color index No. 77115)
Example 13: zinc oxide (color index No. 77947)

TABLE 1

| Example No. | Pigment Slurry Reaction System | | Solution A | | Acid Gas | | |
|---|---|---|---|---|---|---|---|
| | pH | Temperature (°C.) | Amount Added (g) | Rate of Addition (g/min) | Gas | Introduction Rate (ml/min) | Introduction Time (min) |
| 9 | 9.5–10.0 | 85–90 | 312 | 2.1 | NO | 32.0 | 180 |
| 10 | " | 90–95 | " | " | $Cl_2$ | 24.4 | " |
| 11 | " | " | " | " | HBr | 24.4 | " |
| 12 | " | " | " | " | mixture gas ($CO_2$:$SO_2$ = 1:1) | 27.8 | " |
| 13 | 9.0–9.5 | 85–90 | " | " | mixture gas ($CO_2$:$NO_2$ = 1:1) | 32.0 | " |

EXAMPLE 14

The procedure of Example 1 was repeated to treat 100 g of red lead (color index No. 77578) dispersed in 1,000 g of water except that a mixed gas ($CO_2$:$SO_2$:-

$NO_2 = 1:1:1$) was introduced as the acid gas at a rate of 21.4 ml/min for 180 minutes. About 109 g of a red lead composition the particles of which were coated with fine, dense amorphous silica.

EXAMPLES 15 TO 22

The pigments listed below were treated by the procedure of Example 14 under the conditions specified in Table 2, and the respective pigment compositions having particles coated with fine, dense amorphous silica were provided. The concentration, amount added and rate of addition of Solution A are the same as in Example 14.

Example 15: litharge (color index No. 77577)
Example 16: cobalt violet (color index No. 77360)
Example 17: cobalt blue (color index No. 77346)
Example 18: cobalt green (color index No. 77335)
Example 1: manganese violet (color index No. 77742)
Example 20: manganese blue (color index No. 77112)
Example 21: viridian (color index No. 77289)
Example 22: chromium oxide green (color index No. 77288)

TABLE 2

| Example No. | Pigment Slurry Reaction System | | Acid Gas | | |
|---|---|---|---|---|---|
| | pH | Temperature (°C.) | Gas | Introduction Rate (ml/min) | Introduction Time (min) |
| 15 | 9.5–10.0 | 85–90 | mixture gas ($SO_2:NO_2 = 1:1$) | 21.7 | 180 |
| 16 | " | 90–95 | HBr | 16.4 | " |
| 17 | " | " | $Br_2$ | " | " |
| 18 | " | " | $Cl_2$ | " | " |
| 19 | " | " | HCl | " | " |
| 20 | " | 85–90 | $NO_2$ | 21.7 | " |
| 21 | " | 90–95 | $SO_2$ | 16.4 | " |
| 22 | 9.0–9.5 | 85–90 | $CO_2$ | 21.7 | " |

EXAMPLE 23

100 g of dried and ground particles of chrome yellow were dispersed in 840 g of water and stirred at room temperature to form a uniform slurry. An aqueous solution of sodium silicate (JIS No. 3) was added to the slurry to bring its pH to within the range of from 9.0 to 10.0. The slurry was then passed through a homogenizer to make a uniform dispersion of pigment particles. An ultrasonic oscillating generator (manufactured by Branson Co., Ltd., U.S.A., resonance freq.: 50 KHz, generator: lead titanate zirconate) was used to generate ultrasonic waves which minimized the formation of secondary particles of chrome yellow, while the temperature of the slurry was held between 90° and 95° C. and the pH was held between 9.0 and 10.0 by adding, as required, an aqueous solution of sodium hydroxide. To the slurry being stirred, 500 g of an aqueous solution of sodium silicate having a concentration of 4.83 wt% as $SiO_2$ (the solution was referred to as Solution A) and $SO_2$ gas were added or introduced simultaneously at rates of 3.4 g/min and 39.0 ml/min for Solution A and sulfur dioxide, respectively. The gas was introduced for 180 minutes. Throughout the addition of the Solution A and the introduction of the gas, the slurry was controlled to have a pH between 9.0 and 10.0. The generation of ultrasonic waves was continued to the end of the reaction. The procedure of Example 1 was repeated to provide about 120 g of a chrome yellow composition the particles of which were covered with fine, dense amorphous silica.

EXAMPLE 24

100 g of a synthetic yellow oxide pigment were dispersed in 480 g of water containing 0.48 g of ferric chloride and stirred at room temperature to form a uniform dispersion. To the slurry prepared as in Example 23, 128 g of an aqueous solution of sodium silicate having a concentration of 4.83 wt% as $SiO_2$ (the solution is referred to as Solution A) and $CO_2$ gas were added or introduced simultaneously at rates of 0.9 g/min and 13.0 ml/min for Solution A and $CO_2$, respectively. The gas was introduced for 180 minutes. The generation of ultrasonic waves was continued throughout the addition of the Solution A and the introduction of the gas as in Example 23. The procedure of Example 3 was repeated to provide about 106 g of a synthetic yellow oxide pigment the particles of which were covered with a fine, dense amorphous silica.

EXAMPLE 25

Three types of bronze powder (89% Cu and 11% Zn, or 74% Cu and 26% Zn, color index No. 77440) were prepared. One type was subjected to the conventional preliminary heat treatment using boric acid (See Comparative Sample No. 3), the second was subjected to the conventional chromate treatment (See Comparative Sample No. 4), and the third was subjected to neither surface treatment. 100 grams of each type were dispersed in 700 g of water containing 0.7 g of a surfactant ("Nonionic OD 100", manufactured by Emulsol Co., Ltd.). The ultrasonic oscillating generator used in Example 23 was used to generate ultrasonic waves that thoroughly dispersed the pigment particles in water, while the slurry was held at a temperature between 90° and 95° C. and a pH between 9.5 and 10.2. To the slurry being stirred, 103 g of an aqueous solution of sodium silicate having a concentration of 4.83 wt% as $SiO_2$ (the solution is referred to as Solution A) and $CO_2$ gas were added or introduced simultaneously at rates of 0.69 g/min (Solution A) and 10.0 ml/min ($CO_2$ gas) while the pH was maintained between 9.5 and 10.2. The gas was introduced for 180 minutes. A fine silica sol resulted to form a uniform deposit on the pigment particles. The pH of the slurry was adjusted to a level between 7.0 and 7.5 in a conventional method, and then the slurry was washed with water, filtered and dried. About 103 g of a bronze powder composition having particles covered with fine amorphous silica was provided from each type of bronze powder.

EXAMPLE 26

1000 g of a 0.4 wt% aqueous solution of sodium hydroxide were added to 100 g of a synthetic yellow oxide pigment, and the mixture was subjected to a 5-hour hydrothermal treatment at 180° C. and 10 kg/cm². After thorough washing with water by decantation, a dispersing mill was used to redisperse the pigment particles to obtain the initial slurry concentration, and an aqueous solution of sodium silicate (JIS No. 3) was added to the resulting slurry to bring its pH to between 9.5 and 10.0. The slurry was held at a temperature between 85° and 90° C. and held at a pH between 9.5 and 10.0 by adding an aqueous solution of sodium hydroxide, if necessary. To the slurry being stirred, 128 g of an aqueous solution of sodium silicate having a concentration of 4.83 wt% as $SiO_2$ (the solution is referred to as Solution A) and $CO_2$ gas were added or introduced simultaneously at rates of 0.9 g/min and 13.0 ml/min for Solution A and $CO_2$ gas, respectively. The gas was introduced for 180 minutes. Throughout the addition of the Solution A and the introduction of the gas, the pH of the slurry was maintained between 9.5 and 10.0. The slurry was allowed to stand at a pH between 6.5 and 7.0, washed with water by decantation until no more sodium salt was detected, and filtered and dried to provide about 106 g of a synthetic yellow oxide pigment having particles covered with fine, dense amorphous silica.

EXAMPLE 27

1000 g of a 0.4 wt% aqueous solution of sodium hydroxide were added to 100 g of a synthetic yellow oxide pigment, and the mixture was subjected to a 2-hour hydrothermal treatment at 180° C. and 10 kg/cm². To the resulting slurry, 167 g of an aqueous solution of zirconyl sulfate having a concentration of 0.3 wt% as $ZrO_2$ were added gradually at room temperature. After the addition, hydrolysis occurred in the slurry to form the fine deposit of zirconium hydroxide on the pigment particles. The slurry was then neutralized to a pH of 6.0, washed with water, the particles redispersed to obtain the initial slurry concentration, and the slurry was mixed with an aqueous solution of sodium silicate (JIS No. 3) to adjust the pH to a level between 9.5 and 10.0. The slurry temperature was held between 85° and 90° C., and the pH was held between 9.5 and 10.0 by adding an aqueous solution of sodium hydroxide, if necessary. To the slurry being stirred, 128 g of an aqueous solution of sodium silicate having a concentration of 4.83 wt% as $SiO_2$ (the solution is referred to as Solution A) and $CO_2$ gas were added or introduced simultaneously at rates of 0.9 g/min and 13.0 ml/min for Solution A and $CO_2$ gas, respectively. The gas was introduced for 180 minutes. Throughout the addition of the Solution A and the introduction of the gas, the pH was held within the range of from 9.5 to 10.0. The procedure of Example 26 was repeated to provide about 106.5 g of a synthetic yellow oxide composition having particles covered with zirconium-silica.

EXAMPLE 28

1000 g of a 2 wt% aqueous solution of sodium hydroxide were added to 100 g of a synthetic yellow oxide pigment, and the mixture was subjected to a 2-hour hydrothermal treatment at 150° C. and 5 kg/cm². The slurry was washed with water, and 100 g of an aqueous solution of aluminum sulfate having a concentration of 0.5 wt% as $Al_2O_3$ were added to the slurry at room temperature. After the addition, the slurry was neutralized to a pH of 6.0, washed with water, and a dispersing mill was used to redisperse the pigment particles to obtain the initial slurry concentration. The procedure of Example 26 was repeated to prepare a slurry having a temperature between 85° and 90° C. and a pH between 9.5 and 10.0. To the slurry being stirred, 128 g of an aqueous solution of sodium silicate having a concentration of 4.83 wt% was $SiO_2$ (the solution is referred to as Solution A) and $SO_2$ gas were added or introduced simultaneously at rates of 0.9 g/min and 10.0 ml/min for Solution A and sulfur dioxide, respectively. The gas was introduced for 180 minutes. Throughout the addition of the Solution A and the introduction of the gas, the pH of the slurry was held between 9.5 and 10.0. the procedure of Example 26 was repeated to provide about 106.5 g of a synthetic yellow oxide composition having particles covered with aluminum-silica.

EXAMPLE 29

1000 g of a 2 wt% aqueous solution of sodium hydroxide were added to 100 g of a synthetic yellow oxide pigment, and the mixture was subjected to a 5-hour hydrothermal treatment at 150° C. and 5 kg/cm². The slurry was washed with water, and 100 g of an aqueous solution of titanium sulfate having a concentration of 1.0 wt% as $TiO_2$ were added to the slurry at room temperature. After the addition, the slurry was neutralized to a pH between 6.0 and 6.5. The procedure of Example 26 was repeated to prepare a uniform slurry having a temperature between 85° and 90° C. and a pH between 9.5 and 10.0. To the slurry being stirred, 128 g of an aqueous solution of sodium silicate having a concentration of 4.83 wt% as $SiO_2$ (the solution is referred to as Solution A) and $SO_2$ gas were added or introduced simultaneously at rates of 0.9 g/min and 10.0 ml/min for Solution A and $SO_2$ gas, respectively. The gas was introduced for 180 minutes. Throughout the addition of the Solution A and the introduction of the gas, the pH of the slurry was held between 9.5 and 10.0. The procedure of Example 26 was repeated to provide about 107 g of a synthetic yellow oxide composition having particles covered with titanium-silica.

EXAMPLE 30

1000 g of a 4 wt% aqueous solution of sodium hydroxide were added to 100 g of a synthetic yellow oxide pigment, and the mixture was subjected to a 2-hour hydrothermal treatment at 150° C. and 5 kg/cm². The slurry was washed with water, and 100 g of an aqueous solution of cerium chloride having a concentration of 0.5 wt% as $CeO_2$ were added to the slurry at room temperature. After the addition, the slurry was neutralized to a pH between 6.0 and 6.5. The procedure of Example 26 was repeated except that 128 g of an aqueous solution of sodium silicate having a concentration of 4.83 wt% as $SiO_2$ (the solution is referred to as Solution A) and $SO_2$ gas added or introduced simultaneously to the slurry at rates of 0.9 g/min (Solution A) and 10.0 ml/min (acid gas) under stirring. About 106.5 g of synthetic yellow oxide composition having particles covered with cerium-silica was provided.

EXAMPLE 31

1000 g of a 8 wt% aqueous solution of sodium hydroxide were added to 100 g of a synthetic yellow oxide pigment, and the mixture was subjected to a 3-hour hydrothermal treatment at 95° C. and under atmospheric pressure. The slurry was washed with water, and 100 g of an aqueous solution of antimony chloride having a concentration of 0.3 wt% as $Sb_2O_3$ were added to the slurry at room temperature. After the addition, the slurry was neutralized to a pH between 6.0 and 6.5. The procedure of Example 26 was repeated except that 128 g of an aqueous solution of sodium silicate having a concentration of 4.83 wt% as $SiO_2$ (the solution is referred to as Solution A) and $NO_2$ gas were added or introduced simultaneously to the slurry at rates of 0.9 g/min (Solution A) and 13.0 ml/min (acid gas) while the slurry was stirred and controlled to have a pH between 9.5 and 10. About 106.3 g of a synthetic yellow oxide composition having particles covered with antimony silica were provided.

EXAMPLE 32

1000 g of a 8 wt% aqueous solution of sodium hydroxide were added to 100 g of a synthetic yellow oxide pigment, and the mixture was subjected to a 5-hour hydrothermal treatment at 95° C. and under atmospheric pressure. The slurry was washed with water, and 100 g of an aqueous solution of magnesium chloride having a concentration of 1.0 wt% as MgO were added to the slurry at room temperature. After the addition, the slurry was neutralized to a pH between 6.0 and 6.5. The procedure of Example 26 was repeated except that 128 g of an aqueous solution of sodium silicate having a concentration of 4.83 wt% as $SiO_2$ (the solution is referred to as Solution A) and $NO_2$ gas were added or introduced simultaneously to the slurry at rates of 0.9 g/min (Solution A) and 13.0 ml/min (acid gas) while the slurry was stirred and controlled for its pH. About 107 g of a synthetic yellow oxide composition having particles covered with magnesium-silica was provided.

EXAMPLE 33

A slurry of chrome yellow (containing 200 g of the pigment) was added to 330 g of water containing one gram of zirconyl sulfate ($ZrO.SO_4.nH_2O$) as $ZrO_2$, and an aqueous solution of sodium carbonate was added to the mixture to adjust its pH to 6.4. After washing with water by decantation, the slurry was filtered, and the cake was dried with a dryer (95°–100° C.) for a period of 12 hours to provide 201 g of chrome yellow covered with zirconium. 100 g of ground particles of the dried pigment were dispersed in 840 g of water, and stirred at room temperature to form a uniform mixture. An aqueous solution of sodium silicate (JIS No. 3) was added to the slurry to bring its pH to between 9.0 and 10.0. The slurry was then passed through a homogenizer to make a uniform dispersion of the pigment particles which was held at a temperature between 85° and 90° C. and held at a pH between 9.0 and 10.0 by adding, as required, an aqueous solution of sodium hydroxide. To the slurry being stirred, 500 g of an aqueous solution of sodium silicate having a concentration of 4.83 wt% as $SiO_2$ (the solution is referred to as Solution A) and exhaust gas of boiler ($CO_2$: 12%, $SO_2$: 300 ppm and $NO_2$: 500 ppm) were added or introduced simultaneously at rates of 3.4 g/min and 430 ml/min for Solution A and the exhaust gas, respectively. The gas was introduced for 180 minutes. Throughout the addition of the Solution A and the introduction of the gas, the slurry was held at a pH between 9.0 and 10.0. A fine silica sol precipitated to form a uniform deposit on the pigment particles. The slurry was left to stand at a pH between 6.5 and 7.0, washed with water by decantation until no sodium salt was detected, and filtered and dried to provide about 120 g of a chrome yellow composition having particles covered with zirconium-silica.

EXAMPLE 34

A slurry of chrome vermilion (containing 200 g of the pigment) was added to 200 g of an aqueous solution of cerium chloride having a concentration of 0.5 wt% as $CeO_2$. The procedure of Example 33 was repeated except that 500 g of an aqueous solution of sodium silicate having a concentration of 4.83 wt% as $SiO_2$ (the solution was referred to as Solution A) and exhaust gas of combustion furnace ($CO_2$: 13%, $SO_2$: 1000–1500 ppm, $NO_2$: 320 ppm and water cont.: 3%) were added or introduced simultaneously to the slurry at rates of 3.4 parts/min (Solution A) and 400 ml/min (acid gas) at a controlled pH under stirring. About 120 g of a chrome vermilion composition having particles covered with cerium-silica was provided.

EXAMPLE 35

A slurry of synthetic yellow oxide pigment (containing 200 g of the pigment) was added to 200 g of an aqueous solution of magnesium chloride having a concentration of 1.0 wt% as MgO. After the addition, an aqueous solution of sodium carbonate was added to the slurry to adjust its pH to between 6.0 and 6.5. The slurry was washed with water, filtered and dried to provide 202 g of a magnesium-covered synthetic yellow oxide. 100 g ground particles of the dried pigment were dispersed in 480 g of water containing 0.48 g of ferric chloride. The procedure of Example 33 was repeated except that 128 g of an aqueous solution of sodium silicate having a concentration of 4.83 wt% as $SiO_2$ (the solution is referred to as Solution A) and exhaust gas of boiler ($CO_2$: 12%, $SO_2$: 300 ppm and $NO_2$: 500 ppm) were added or introduced simultaneously to the slurry at rates of 0.9 parts/min (Solution A) and 110 ml/min (acid gas) under stirring. About 106 g of a synthetic yellow oxide composition the particles of which were covered with magnesium-silica was provided.

EXAMPLE 36

A slurry of red oxide (containing 200 g of the pigment) was added to 200 g of an aqueous solution of aluminum sulfate having a concentration of 0.5 wt% as $Al_2O_3$. The procedure of Example 35 was repeated except that 128 g of an aqueous solution of sodium silicate having a concentration of 4.83 wt% as $SiO_2$ (the solution is referred to as Solution A) and exhaust gas of boiler ($CO_2$: 12%, $SO_2$: 300 ppm and $NO_2$: 500 ppm) were introduced simultaneously to the slurry at rates of 0.9 parts/min (Solution A) and 110 ml/min (acid gas) under stirring. About 106 g of a red oxide composition having particles covered with aluminum-silica was provided.

EXAMPLE 37

A slurry of red lead (containing 200 g of the pigment) was added to 200 g of an aqueous solution of antimony chloride having a concentration of 0.3 wt% as $Sb_2O_3$. The procedure of Example 33 was repeated except that 210 g of an aqueous solution of sodium silicate having a concentration of 4.83 wt% as $SiO_2$ (the solution is referred to as Solution A) and exhaust gas of boiler ($CO_2$: 12%, $SO_2$: 300 ppm and $NO_2$: 500 ppm) were added or introduced simultaneously to the slurry at rates of 1.4 parts/min (Solution A) and 180 ml/min (acid gas) under stirring. About 109 g of a red lead composition having particles covered with antimony-silica was provided.

EXAMPLE 38

200 g of well ground particles of antimony trioxide were dispersed in 2,000 g of water and stirred at room temperature to form a uniform slurry. The slurry was then passed through a homogenizer to make a uniform dispersion of the pigment particles. Two hundred grams of an aqueous solution of titanium sulfate having a concentration of 1.0 wt% as $TiO_2$ were added to the slurry, and then an aqueous solution of sodium hydroxide was added to the slurry to bring its pH to about 6.0. The procedure of Example 33 was repeated except that 128 g of an aqueous solution of sodium silicate having a concentration of 4.83 wt% as $SiO_2$ (the solution is referred to as Solution A) and combustion exhaust gas of heavy oil were added or introduced simultaneously to the slurry at rates of 0.9 parts/min (Solution A) and 102 ml/min (acid gas) while the pH of the slurry was held between 9.0 and 10.0. About 106 g of an antimony trioxide composition having particles covered with titanium silica was provided.

EXAMPLE 39

The procedure of Example 1 was repeated to prepare a slurry of 100 g of chrome yellow pigment, and a 4.83 wt% aqueous solution of sodium silicate (Solution A) and $CO_2$ gas (acid gas) were added or introduced simultaneously to the slurry in the rates of the addition and introduction, and the introduction time specified in Table 3 below. Chrome yellow compositions having particles covered with different proportions of fine amorphous silica were provided as shown in Table 3.

TABLE 3

| | Solution A | | Acid Gas | | |
| --- | --- | --- | --- | --- | --- |
| Run No. | Amount Added (g) | Rate of Addition (g/min) | Rate of Introduction (ml/min) | Introduction Time (minutes) | $SiO_2$ (wt %) |
| 1 | 82.8 | 2.1 | 31.0 | 50 | 3.9 |
| 2 | 290.4 | 3.0 | 49.0 | 110 | 12.3 |
| 3 | 668.2 | 3.7 | 59.1 | 210 | 24.4 |
| 4 | 1269.0 | 4.3 | 71.5 | 330 | 38.0 |

EXAMPLE 40

The procedure of Example 3 was repeated to prepare a slurry of 100 g of a synthetic yellow oxide pigment, and a 4.83 wt% aqueous solution of sodium silicate (Solution A) and sulfur dioxide (acid gas) were added or introduced simultaneously to the slurry in the rates of the addition and introduction, and the introduction time specified in Table 4 below. Synthetic yellow oxide pigment compositions having particles covered with different proportions of fine amorphous silica were provided as shown in Table 4.

TABLE 4

| | Solution A | | Acid Gas | | |
| --- | --- | --- | --- | --- | --- |
| Run No. | Amount Added (g) | Rate of Addition (g/min) | Rate of Introduction (ml/min) | Introduction Time (minutes) | $SiO_2$ (wt %) |
| 1 | 82.8 | 2.1 | 23.3 | 50 | 3.9 |
| 2 | 207.0 | 2.3 | 27.7 | 105 | 9.2 |
| 3 | 518.0 | 2.9 | 36.4 | 200 | 20.2 |
| 4 | 828.0 | 3.4 | 38.8 | 300 | 28.8 |

EXAMPLE 41

The procedure of Example 8 was repeated to prepare a slurry of 100 g of an ultramarine pigment, and a 4.84 wt% aqueous solution of sodium silicate (Solution A) and $CO_2$ gas (acid gas) were added or introduced simultaneously to the slurry in the rates of the addition and the introduction and the introduction time specified in Table 5 below. Ultramarine compositions having particles covered with different proportions of fine amorphous silica were provided as shown in Table 5.

TABLE 5

| | Solution A | | Acid Gas | | |
| --- | --- | --- | --- | --- | --- |
| Run No. | Amount Added (g) | Rate of Addition (g/min) | Rate of Introduction (ml/min) | Introduction Time (minutes) | $SiO_2$ (wt %) |
| 1 | 82.8 | 2.1 | 31.0 | 50 | 3.9 |
| 2 | 207.0 | 2.3 | 37.0 | 105 | 9.2 |
| 3 | 518.0 | 2.9 | 48.1 | 200 | 20.2 |
| 4 | 828.0 | 3.4 | 51.3 | 300 | 28.8 |

EXAMPLE 42

The procedure of Example 25 was repeated to prepare a slurry of 100 g of a bronze powder (89% Cu and 11% Zn, average particle size 25μ), and a 4.83 wt% aqueous solution of sodium silicate (Solution A) and sulfur dioxide (acid gas) were added or introduced simultaneously to the slurry in the rates of the addition and the introduction, and the introduction time specified in Table 6 below. Bronze powder compositions having particles covered with different proportions of fine amorphous silica were provided as shown in Table 6.

TABLE 6

| | Solution A | | Acid Gas | | |
| --- | --- | --- | --- | --- | --- |
| Run No. | Amount Added (g) | Rate of Addition (g/min) | Rate of Introduction (ml/min) | Introduction Time (minutes) | $SiO_2$ (wt %) |
| 1 | 31.5 | 0.8 | 9.0 | 50 | 1.5 |
| 2 | 178.0 | 1.9 | 22.8 | 110 | 8.0 |
| 3 | 366.5 | 2.4 | 30.3 | 170 | 15.0 |
| 4 | 652.2 | 3.6 | 43.6 | 210 | 24.0 |

COMPARATIVE EXAMPLE 1

100 parts of dried, pulverized ultramarine was uniformly dispersed in 1000 parts of water with stirring to obtain a slurry. After an aqueous solution of sodium silicate (JIS No. 3) was added to the slurry as a dispersing agent, the slurry was stirred using a homogenizer to make a uniform slurry of the pigment particles, followed by heating to 90°–95° C. and maintaining the temperature and adjusting the pH of the slurry of 9.0–9.5 by adding, as required, a sodium hydroxide aqueous solution. Subsequently the same procedures as in Example 1 were repeated except 312 parts of Solution A was added at a rate of 2.1 parts/min without the introduction of the $CO_2$ gas.

COMPARATIVE EXAMPLE 2

The same procedures as in Comparative Example 1 were repeated except 312 parts of Solution A and 348 parts of a 2.3 wt% sulfuric acid aqueous solution were added simultaneously with stirring at rates of 2.1 parts/min and 1.9 parts/min, respectively. During the addition of the solutions, the pH of the slurry was maintained at 9.0–9.5. As the sulfuric acid solution was added, the ultramarine particles became gradually white while emitting the smell of hydrogen sulfide, and when half the amount of the sulfuric acid solution was added the ultramarine particles lost their blue color tone and became completely white as if it were a white pigment. Thus the subsequent procedures were abandoned.

COMPARATIVE EXAMPLE 3

200 ml of a methyl alcohol solution or ethyl alcohol solution containing 20 parts of boric acid, or 200 ml of a methyl alcohol aqueous solution or ethyl alcohol aqueous solution (alcohol:water; 1:1 by volume) containing 20 parts of boric acid and unhydrous borax (1:1) and bronze powder (Cu: 89% and Zn: 11%; or Cu: 74% and Zn: 26%) having average particle sizes of $18\mu$, $20\mu$, $25\mu$ and $35\mu$, respectively, were mixed and allowed to stand for about 1 hour. After filtration of the resulting mixture, the particles obtained were dried and subjected to heat-treatment for about 5 minutes at a temperature of 250° to 300° C. in the case using the former alcohol solution and at a temperature of 450° to 500° C. in the case using the latter alcohol aqueous solution, respectively, followed by cooling to obtain heat-resistant bronze powder.

COMPARATIVE EXAMPLE 4

35 parts of dioxane was added to a mixture of 15 parts of water, 1 part of chromic acid anhydride and 0.1 cc of 85% phosphoric acid. Bronze powder (Cu: 89% and Zn: 11%; or Cu: 74% and Zn: 26%) having average particle sizes of $18\mu$, $20\mu$, $25\mu$ and $35\mu$, respectively, were immersed in the resulting mixture at 60° C. for 1 hour with stirring. After filtration and drying, the particles were subjected to a chromate-treatment to obtain an anti-corrosive bronze powder.

Tests and their results

1. Acid resistance test (A)
   A painted plate was immersed in 5 wt% $H_2SO_4$ at 50° C. for 8 hours, and the resulting change was checked.
2. Acid resistance test (B)
   A pigment powder was immersed in 1 wt% $H_2SO_4$ at 50° C. for 8 hours, filtered, washed with water and dried, at the resulting weight loss and change in the color of the recovered pigment were checked.
3. Alkali resistance test
   A pigment powder was immersed in 1 wt% aqueous solution of potassium hydroxide at room temperature for 12 hours, filtered, washed with water and dried, and the resulting weight loss and change in the color of the recovered pigment were checked.
4. Hydrogen sulfide resistance test
   A test piece was immersed in saturated hydrogen sulfide water at room temperature for 1 hour, and the resulting change in hue was checked.
5. Heat resistance test
   A mixture of 100 parts of polyethylene powder from medium-low pressure polymerization process and 0.5 parts of a sample pigment held at different temperature between 200° and 260° C. for 5 minutes during which it was injection-molded to form panels, and the resulting change was checked.
6. Light resistance test
   A sample was exposed to a fadeometer for 500 hours, and the resulting change was checked.
7. Weatherability test
   A sample was exposed to a weatherometer for 1,000 hours, and any chalking and change in color were checked.
8. Dispersibility test
   A pigment formulated as a paint was applied by an applicator to a glass plate in a thickness of 3 mils, baked at 150° C. for 30 minutes, and the surface of the film was observed.
9. Thickening test
   A pigment formulated as a paint was placed in an air-tight container and left to stand at 50° C. for a given period of time. The resulting increase in the viscosity was checked by a viscosimeter.

(I) The paints and painted plates tested in Tests No. 1, 6, 7, 8 and 9 were prepared by the following method:
Eighty parts of a melamine alkyd resin were mixed with 20 parts of the sample pigment, 20 parts of xylol and 200 parts of beads, and the mixture was stirred in a paint shaker for 30 minutes to form a uniform dispersion. The dispersion was filtered to separate the beads. The filtrate was applied to a specified steel sheet by an applicator, left to stand for 30 minutes, and baked at 150° C. for 30 minutes to thereby obtain a test piece.

(II) Preparation of the test pieces used in Test No. 4
A 50 g sample of a mixture of 100 parts of PVC (soft), 50 parts of DOP, 0.5 parts of barium stearate, and 0.5 parts of calcium stearate was mixed with 0.5 g of a sample pigment and milled with a heated roll at 160° C. for 3 minutes until a sheet was provided. The sheet was cut into test pieces of a suitable size.

TABLE 7

| | Test Results | | | | | | | | |
|---|---|---|---|---|---|---|---|---|---|
| | Test No. | | | | | | | | |
| | 1 | 2 | 3 | 4 | 5 | 6 | 7 | 8 | 9 |
| Example No. | | | | | | | | | |
| 1 | 5 | 5 | 5 | 5 | 5 | 5 | 5 | 5 | 5 |
| 2 | 5 | 5 | 5 | 5 | 5 | 5 | 5 | 5 | 5 |
| 3 | 5 | 5 | 5 | 5 | 5 | 5 | 5 | 5 | 5 |
| 4 | 5 | 5 | 5 | 5 | 5 | 5 | 5 | 5 | 5 |
| 5 | 5 | 5 | 5 | 5 | 5 | 5 | 5 | 5 | 5 |
| 8 | 5 | 5 | 5 | 5 | 5 | 5 | 5 | 5 | 5 |
| 14 | 5 | 5 | 5 | 5 | 5 | 5 | 5 | 5 | 5 |
| 15 | 5 | 5 | 5 | 5 | 5 | 5 | 5 | 5 | 5 |
| 25 | 5 | 5 | 5 | 5 | 5 | 5 | 5 | 5 | 5 |
| 26 | 5 | 5 | 5 | 5 | 5 | 5 | 5 | 5 | 5 |
| Comparative Example No. | | | | | | | | | |
| 1 | 1 | 1 | 4–5 | 5 | 4 | 4 | 4 | 3 | 4 |
| 3 | 1–2 | 1–2 | 1–2 | 1 | 2–3 | 2 | 1–2 | 3 | 1–2 |
| 4 | 2 | 2 | 2 | 1–2 | 2–3 | 2–3 | 2–3 | 3 | 2–3 |

Note:
Evaluation 1: Bad  2: Fair  3: Good  4: Very Good  5: Excellent

The pigments prepared in the examples of this invention were very stable and resistant to the hostile testing conditions. On the other hand, the controls deteriorated to a great extent. The effect of this invention was particularly conspicuous with chromate pigments, iron oxide pigments, lead oxide pigments, ultramarine and metal powder pigments.

While the invention has been described in detail and with reference to specific embodiments thereof, it will be apparent to one skilled in the art that various changes and modifications can be made therein without departing form the spirit and scope thereof.

What is claimed is:

1. A process for preparing a stable inorganic pigment composition having improved pigment characteristics wherein a fine amorphous silica is coated as a non-porous, continuous film on the surface of an inorganic pigment, said process comprising
   reacting sodium silicate and $CO_2$ in an aqueous slurry of said inorganic pigment by separately and gradually adding an aqueous solution of said sodium silicate and said $CO_2$ to said slurry simultaneously at rates which do not vary the pH of said slurry more than ±0.5, with the silica coating being formed under atmospheric pressure, under conditions such that the temperature is not lower than about 60° C. and under a pH of between 7 and 11 and with said inorganic pigment being ultramarine.

2. The process of claim 1, wherein the aqueous slurry of the inorganic pigment is prepared by hydrothermal treatment with alkali.

3. The process of claim 1, wherein the aqueous slurry of the inorganic pigment is a slurry of pigment covered with a fine hydrous oxide of metal selected from the group consisting of zirconium, aluminum, titanium, cerium, antimony and magnesium.

4. The process of claim 1, wherein the acid gas is an acid exhaust gas.

* * * * *